(12) United States Patent
Kley et al.

(10) Patent No.: US 8,162,620 B2
(45) Date of Patent: Apr. 24, 2012

(54) METHOD FOR CONTROL OF A PRESSURISED AIR SUPPLY SYSTEM FOR A MOTOR VEHICLE

(75) Inventors: Markus Kley, Ellwangen (DE); Heinz Höller, Crailsheim (DE); Klaus Vogelsang, Crailsheim (DE); Reinhold Pittius, Crailsheim (DE); Kurt Adleff, Crailsheim (DE); Werner Adams, Crailsheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 1238 days.

(21) Appl. No.: 11/721,288

(22) PCT Filed: Oct. 8, 2005

(86) PCT No.: PCT/EP2005/010861
§ 371 (c)(1),
(2), (4) Date: Jun. 8, 2007

(87) PCT Pub. No.: WO2006/061056
PCT Pub. Date: Jun. 15, 2006

(65) Prior Publication Data
US 2008/0206070 A1     Aug. 28, 2008

(30) Foreign Application Priority Data
Dec. 10, 2004  (DE) .......................... 10 2004 059 834

(51) Int. Cl.
*F04B 49/08*  (2006.01)
(52) U.S. Cl. ......................................... 417/53; 417/44.2
(58) Field of Classification Search ................ 417/44.2, 417/223, 53; 60/327; 180/165, 280, 302; 700/28, 69, 282, 301; 701/36, 100, 102; 702/1, 33, 45, 98, 113, 114, 127, 138, 140, 702/182, 189
See application file for complete search history.

(56) References Cited

U.S. PATENT DOCUMENTS
1,709,871 A    4/1929 Parke
(Continued)

FOREIGN PATENT DOCUMENTS
DE    197 47 265    5/1999
(Continued)

OTHER PUBLICATIONS
Ip.com Document # IPCOM00002957D; Publication Date: Jul. 8, 2004; http://www.ip.com/pubview/IPCOM000029576D.*
(Continued)

*Primary Examiner* — Devon C Kramer
*Assistant Examiner* — Leonard Weinstein
(74) *Attorney, Agent, or Firm* — Faegre Baker Daniels LLP

(57) ABSTRACT

A method for control of a pressurized air supply system for a motor vehicle. In a supply condition, the air compressor is driven by the drive motor and connected to a compressed air system of the motor vehicle such that compressed air is supplied to the compressed air system. In a non-supply condition, the compressor is not driven and/or connected to the compressed air system. The switching of the supply or non-supply condition results from a comparison of at least one switch pressure value with a pressure in the compressed air system and the topography of the stretch of road on which the vehicle is travelling, which includes the profile of the path which the vehicle must cover within a period of time and/or path distance to a given destination.

22 Claims, 2 Drawing Sheets

U.S. PATENT DOCUMENTS

| | | |
|---|---|---|
| 4,459,085 A | 7/1984 | Tonegawa |
| 5,921,883 A * | 7/1999 | Bellinger .................. 477/33 |
| 6,036,449 A | 3/2000 | Nishar et al. |
| 6,076,622 A * | 6/2000 | Chakraborty et al. ........ 180/169 |
| 6,370,451 B2 | 4/2002 | Lutz |
| 6,546,899 B1 * | 4/2003 | Friedrich et al. ........... 123/41.31 |
| 6,672,060 B1 * | 1/2004 | Buckland et al. .............. 60/602 |
| 2004/0033144 A1 * | 2/2004 | Rush ............................. 417/223 |
| 2004/0094912 A1 * | 5/2004 | Niwa et al. ................. 280/5.518 |
| 2004/0122580 A1 * | 6/2004 | Sorrells .......................... 701/80 |
| 2004/0260441 A1 * | 12/2004 | Dussapt et al. ................. 701/36 |

FOREIGN PATENT DOCUMENTS

| | | |
|---|---|---|
| DE | 198 07 291 | 8/1999 |
| DE | 199 37 381 | 3/2001 |
| WO | 97/49570 | 12/1997 |
| WO | WO 2004020266 A1 * | 3/2004 |

OTHER PUBLICATIONS

IP.com No. IPCOM000029576D electronic publication Jul. 8, 2004.*

* cited by examiner

METHOD FOR CONTROL OF A PRESSURISED AIR SUPPLY SYSTEM FOR A MOTOR VEHICLE

CROSS-REFERENCE TO RELATED APPLICATION

This application is related to and claims the benefit under 35 U.S.C. §119 and 35 U.S.C. §365 of International Application No. PCT/EP2005/010861, filed Oct. 8, 2005.

BACKGROUND

The invention relates to a method for regulating a compressed-air supply system of a motor vehicle, with the system comprising a drive engine which is the drive engine of the motor vehicle, i.e. it is used for moving the motor vehicle, and further comprising an air compressor which supplies a compressed-air system of the vehicle, especially a hydrodynamic coupling which is interposed in the drive connection between the drive engine and the air compressor. The hydrodynamic coupling can be filled and discharged in order to thus switch the air compressor on and off, depending on the pressure state in the compressed-air system. The air compressor is arranged especially as a reciprocating-piston air compressor.

Compressed-air supply systems as related to the invention come with the advantage that as a result of the interposed hydrodynamic coupling an energetically advantageous cut-out of the air compressor is enabled on the one hand when a supply of the compressed-air system of the motor vehicle is not necessary as a result of sufficient pressure level in the same, such that the hydrodynamic coupling is "simply" discharged. On the other hand, vibration damping is effectively achieved by interposing the hydrodynamic coupling between the drive engine and the air compressor and it is reliably prevented that when using a reciprocating-piston air compressor a negative torque is transmitted back from the reciprocating-piston air compressor onto the drive engine or a transmission connected to the same, i.e. a torque which is generated by the compressor and which can occur in the region of the upper dead center of the reciprocating-piston air compressor.

In such a compressed-air supply system there is a plurality of states with different boundary conditions in which the various components of the compressed-air supply system need to cooperate in such a suitable manner that an energetically positive operation is ensured which protects the components. Different boundary conditions are for example the driving of the vehicle as compared with the standstill of the vehicle, the profile of the route which the vehicle is passing, such as driving up or down a hill, and different pressure states in the compressed-air supply system such as above a maximum permissible pressure, below the minimum permissible pressure and below a so-called release pressure at which the spring accumulator in the vehicle braking system is released and beneath which the vehicle is not allowed to drive. This release pressure is obtained by arranging the brakes as "fail safe", which means that in the case of failure of the compressed-air system, the brake shoes are pressed by means of springs, so that braking occurs. From a certain air pressure the brake shoes can then be released actively, so that the vehicle is unable to drive away beneath this pressure.

In all known methods for regulating a compressed-air supply system of a motor vehicle in which the air compressor is driven by means of the drive engine it is common practice to set a fixedly predetermined minimum pressure value and a fixedly predetermined maximum pressure value for the pressure in the compressed-air system for any drive state of the motor vehicle. The pressure in the compressed-air system should always move between said two values, which means that when the pressure in the compressed air system has dropped to the minimum value, the air compressor is started, so that the compressed-air system is supplied. Once the pressure in the compressed-air system has reached the predetermined maximum pressure by said continued supply, the feeding is ended. As a result of this rigid predetermination of the two limit values it may occur that the vehicle is in the process of driving up a steep incline, which despite the full power output of the drive engine leads to an exceptionally low speed of the vehicle and at the same time the pressure in the compressed-air system falls beneath the predetermined minimum value as a result of the connected air consumers and the air compressor is thus started. Because the air compressor is also driven by the drive engine of the motor vehicle, the power intake of the air compressor required for this purpose is not available for driving the vehicle, and the vehicle continues to lose speed even further.

On the other hand, up till now the power intake of the air compressor has not been used in a purposeful energetic manner as a result of the rigidly predetermined limit values for switching the compressor on and off.

Reference is hereby made to the following documents in relation to the state of the art:
U.S. Pat. No. 6,036,449 A
U.S. Pat. No. 1,709,871 A
U.S. Pat. No. 4,459,085 A

SUMMARY

The invention is based on the object of providing a method for regulating a compressed-air supply system of the kind mentioned above which contributes to an energetically advantageous driving mode of the vehicle.

The term compressed-air supply system in connection with the present invention describes the system arranged in the motor vehicle, by means of which compressed air is pumped into the compressed-air system of the vehicle on demand. Said pumping occurs by means of an air compressor which is arranged for example as a reciprocating-piston air compressor and which is driven by the drive engine of the motor vehicle.

Two different switching arrangements are possible for example. According to a first switching arrangement, the air compressor is continually driven by the drive engine of the motor vehicle and the air delivery side of the air compressor is connected when required with the compressed-air system of the vehicle, which occurs whenever a supply is evaluated as necessary as a result of a determined pressure drop in the compressed-air system. The state in which the air compressor will supply the compressed-air system is designated as a supply state within the terms of the present invention.

When it is determined on the basis of the detected pressure conditions in the compressed-air system that the supply is to be ceased, a changeover is made to non-supply state, which means that a further supply of compressed air into the compressed-air system by means of the air compressor is prevented. According to the first switching arrangement, this prevention occurs in such a way that the connection between the air delivery side of the air compressor and the compressed-air system is interrupted, so that the air compressor supplies to the ambient environment.

According to a second switching arrangement which can be used within the scope of the present invention, the air compressor will only be driven in cases when a supply is to be made to the compressed-air system. According to this switching arrangement, the air delivery side can be connected continually with the compressed-air system of the vehicle, but it need not necessarily be so. Activation and deactivation of the air compressor occurs advantageously by means of a hydrodynamic coupling which is arranged in a drive connection between the drive engine and the air compressor. When the hydrodynamic coupling is filled, the torque or rotational power is transferred from the drive engine to the air compressor, whereas in the case of a completely discharged hydrodynamic coupling or one that has been discharged up to a predetermined residual quantity of working medium no drive power is transferred to the air compressor.

In accordance with the invention, the setting of the supply state or non-supply state, with both states obviously being mutually exclusive, occurs depending on at least one switch pressure value, namely a first switch pressure value which could also be called the bottom switch pressure value at which there is changeover to the supply state and a second switch pressure value which can also be called upper switch pressure value at which there is a changeover to the non-supply state.

The pressure in the compressed-air system is compared with the at least one switch pressure value or advantageously with all switch pressure values. The setting of the supply state or the setting of the non-supply state occurs depending on this comparison. If the pressure in the compressed-air system drops beneath the first bottom switch pressure value when two switch pressure values are predetermined, the system switches to the supply state and when the pressure in the compressed-air system reaches the second upper switch pressure value or exceeds the same, the system switches to the non-supply state.

In accordance with the invention, the topography of the route, which means the height profile of the path covered or to be covered by the vehicle, is detected. This detection of the topography can either occur in such a way that the topography is made available in a storage medium which is read out or it can occur by means of a navigation system for example, as is well known to the person skilled in the art and is used for navigating the driver to a selected target.

The detected topography of the route on which the motor vehicle moves comprises the profile of the route which the vehicle needs to cover within a predetermined, directly impending time span and/or within a predetermined, directly impending section with a predetermined target. This means that it is determined which route the vehicle will cover in its further travel in view of its momentary actual position on the detected topography. If it is detected that the vehicle is momentarily situated at half the path of a continuous incline, the route profile contained in the mentioned topography comprises the second half of said incline for example.

The switch pressure value in accordance with the invention or the switch pressure values depending on which of the supply state or the non-supply state is set are determined depending on the detected topography and especially depending on the aforementioned route profile which is contained in the topography and which will be covered by the motor vehicle after its current position.

BRIEF DESCRIPTION OF THE DRAWINGS

The invention is now explained in closer detail within the scope of an embodiment by reference to the drawings and the description of the drawings, wherein.

DETAILED DESCRIPTION

Figure 1:
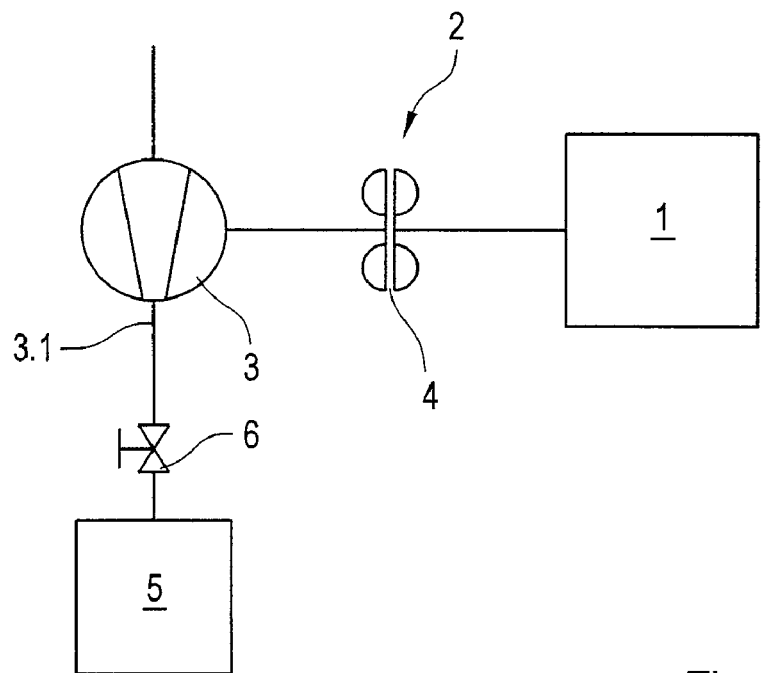
FIG. 1 shows a schematic view of a compressed-air supply system regulated in accordance with the invention.

FIG. 1 shows the drive engine 1 of a motor vehicle which can be switched to a drive connection 2 with an air compressor 3 by filling a hydrodynamic coupling 4 with a working medium, especially oil of the engine oil circulation. When driven by the drive engine 1, which means when the method in accordance with the invention switches to the supply state, the air compressor 3 supplies the compressed air system 5 of the motor vehicle via its air delivery side 3.1.

A switchable and/or controllable throttle 6 is introduced into the line conducting the compressed air on the air delivery side 3.1, which means into the line which connects the air compressor 3 with the compressed-air system 5 in an air-guiding manner. The throttle is used in order to increase the counter-pressure against which the air compressor 3 conveys by throttling the conveyed air flow in a purposeful manner in accordance with an advantageous embodiment of the method in accordance with the invention when in braking operation of the motor vehicle it is intended to transfer as much drive power as possible from the drive engine 1 to the air compressor 3. When the motor vehicles moves down an incline, the supply state is always set and compressed air is discharged from the compressed-air system when the pressure in the compressed-air system exceeds a predetermined maximum permissible pressure. A shut-off valve (not shown) can be arranged alternatively instead of the throttle 6, which shut-off valve interrupts the air flow from the air compressor 3 to the compressed-air system 5 and leads to a continuous increase of the counter-pressure against which the air compressor 3 conveys until a maximum permissible pressure of the air compressor 3 is reached at which a pressure relief valve (not shown) will open and discharge compressed air accordingly. In the case of a complete blockage of the conveying side of the air compressor 3, a rapid rise in pressure will obviously occur depending on the storage capacity of the discharge side of the air compressor 3 because this process is comparable to the filling of a pressure reservoir. Accordingly, the gradual throttling of the conveyed air flow is preferable to a complete blockage because despite the throughput of air through the throttle valve an increase of the counter-pressure of the air compressor 3 is achieved relative to the pressure in the compressed-air system 5.

This purposeful increase of the counter-pressure against which the air compressor 3 coveys will be set precisely when the motor vehicle moves over a mountain route or down an incline. It is thus achieved that the power consumption of the air compressor 3 is increased, so that it will withdraw respective drive power from the drive engine, leading to a braking of the drive engine and thus relieves the adjusting brakes of the vehicle. Since the drive engine is in thrust operation during the descending drive of the motor vehicle, it can be achieved that it will push against a higher moment by the additional power consumption of the air compressor and is thus reduced in its speed.

Figure 2:
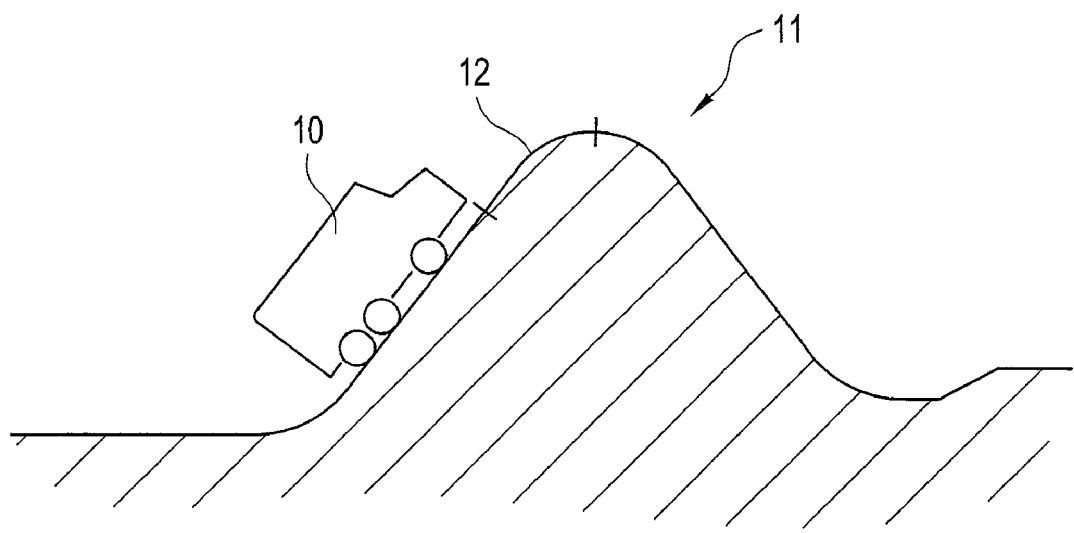
FIG. 2 shows a schematic diagram which shows the movement of a motor vehicle on a route and the topography detected in connection with the same.

FIG. 2 shows a vehicle 10 which drives up an incline. The height profile of the entire route is contained in the detected topography 11. As is shown, the route profile 12 is contained separately in the topography 11 which will be covered by the motor vehicle 10 from its current position during its further travel that will follow directly. An evaluation can occur on the basis of this route profile 12, such that permanent braking in a limited impending time span or in a limited impending route to be covered is not expected. Only upon reaching the end of the drawn route profile 12 will there be a descending section which the motor vehicle 10 will drive down, so that permanent braking can then be expected and it needs to be ensured that there is sufficient compressed air in the compressed-air system 5 for such braking.

Figure 3:
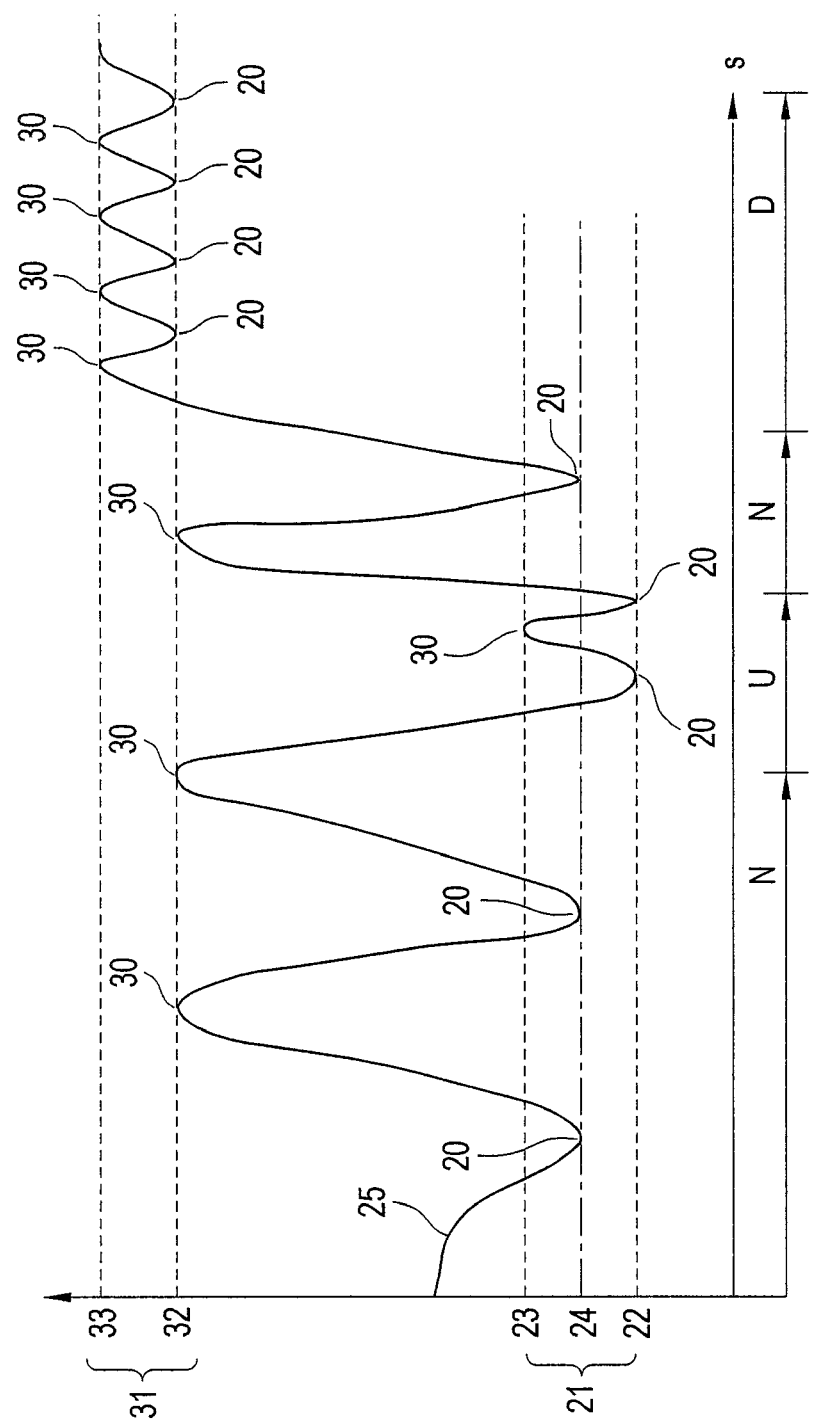
FIG. 3 shows an embodiment for determining two switch pressure values depending on the detected topography or the profile of the route.

FIG. 3 shows a schematic diagram whose abscissa shows the progress of the travel of the motor vehicle on the route and whose ordinate shows the pressure 25 in the compressed-air system 5, the dynamically and varyingly set switch pressure values 20, 30, various pressure limit values 22 to 24 and 32 to 33 and limit ranges 21, 31 for the switch pressure values 20, 30. The abscissa is designated with "s" as a marker for the route to be covered and the ordinate is designated with "p" for pressure. Furthermore, the letter "N" for normal travel is placed beneath the abscissa, which means a section on the route without permanent descents or ascents, "U" for upward driving (Up), which means for continuous ascension of a predetermined minimum length, and "D" for downward driving (Down), which means for a continuous descent of a predetermined minimum length.

Starting on the left of the abscissa, the vehicle moves at first on a normal section of the route, which means on a section without continuous ascents or descents. For example, continuous ascents or descents which lead to a classification of the pertinent route profile outside of normal travel ("U" or "D") can be determined by using a limit value for an ascending value and a limit value for a length of a section within which the ascending value is not undercut. With the ascending value, e.g. both for ascent as well as descent, stating the ascent is stated in a positive percentage value with 100% ascent corresponding to 45 degrees of angle of ascent. With the respective limit values, each route profile can be classified into a normal section (N), descending section or descent (D) and an ascending section or ascent (U).

In the diagram shown in FIG. 3, the vehicle moves at first on a normal section, so that a first switch pressure value 20 is set to a "usual" minimum pressure in the compressed-air system 5. Said usual minimum value lies in a predetermined first pressure range 21 with a bottom limit value 22 and an upper limit value 23, precisely on the arithmetic mean value 24 between the bottom limit value 22 and the upper limit value 23. When the pressure 25 in the compressed-air system 5 drops as a result of supplying one or several air consumers and reaches the first switch pressure value 20, the system switches to supply state, so that the air compressor 3 pumps compressed air into the compressed-air system 5.

Accordingly, the pressure 25 in the compressed-air system 5 increases, as is shown in the curve in the left section of FIG. 3 behind the point, at which the switch pressure value 20 has been reached for the first time.

A second switch pressure value 30 is predetermined which corresponds to an upper limit value for the pressure 25 in the compressed-air system 5 for the currently covered normal section of the route. Said upper limit value can be determined within a predetermined second pressure range 31, with said second pressure range 31 obviously having a substantial predetermined difference relative to the first pressure range 21. In this case, the pressure 32 represents a "normal" upper limit pressure for the compressed-air system 5, with an excess pressure 33, namely the upper limit value 33 of the second pressure range 31 in the compressed-air system 5, being permitted for certain periods of time in special driving situations which will be described below.

When the pressure 25 in the compressed-air system 5 reaches the second switch pressure value 30, the system switches from supply state to non-supply state, so that as a result of the air consumption of the consumer(s) the pressure 25 in the compressed-air system 5 will drop again after the changeover until it reaches the first switch pressure value 20 again, thus leading to a changeover to the supply state again, etc.

When the vehicle now moves up an incline and it is clear on the basis of a performed automatic evaluation of the route profile 12 that as long as the vehicle moves on said route profile 12 no permanent braking is expected requiring a respective store of compressed air in the compressed-air system 5, it is permitted that the pressure 25 in the compressed-air system 5 drops to a reduced minimum pressure. The activation of the air compressor 3 is thus delayed and it is prevented at least for a certain period of time that the drive engine 1 which is highly burdened anyway by moving the motor vehicle 10 up the mountain is burdened additionally by driving the air compressor 3, which would lead to a drop in the speed of the vehicle 10. The first switch pressure value 20 is accordingly set to the lower limit value 22 of the predetermined first pressure range 21, as is shown on the basis of the curve in FIG. 3 in the "U" section.

Only when the pressure 25 reaches the switch pressure value 20 in the compressed-air system 5, which switch pressure value is now set comparatively low, the air compressor 3 will be started, so that the pressure 25 in the compressed-air system 5 will rise again.

Since the vehicle continues to drive up the ascent and since it is clear after the evaluation of the route profile 12 that no permanent braking is to be expected, the burden on the drive engine 1 of vehicle 10 by the drive of the air compressor 3 is kept as short as possible, such that the second switch pressure value 30 is set to the upper limit value 23 of the first pressure range 21. As can be seen in FIG. 3, the air compressor 3 is driven over only a comparatively short period of time and after reaching the second switch pressure value 30 by the pressure 25 in the compressed-air system 5 the air compressor 3 will be cut off, which means the system switches over to the non-supply state, as a result of which the pressure 25 decreases in the compressed-air system 5 gradually to the first switch pressure value 20 again.

After this ascending section, the vehicle 10 moves on a normal section again, so that the first switch pressure value 20 is set to the value 24 again and the second switch pressure value 30 is set to the value 32 again.

Finally, the vehicle 10 moves down a descending section (section "D") and the setting of the two switch pressure values 20 and 30 occurs in such a way that an increased wear-free braking effect is exerted by a power-intensive drive of the air compressor 3 on the drive engine 1. As is shown in FIG. 3, the first switch pressure value 20 is set to the bottom limit value 32 of the second predetermined pressure range 31 when the vehicle moves down a descent, whereas the second switch pressure value 30 is set to the upper limit value 33 of the second predetermined pressure range 31. This ensures that the air compressor 3 is driven comparatively frequently, which is always on the sections of the pressure progress 25 in the compressed-air system 5, starting with the first switch pressure value 20 up to the second switch pressure value 30. The air compressor 3 simultaneously works against a relatively high counter-pressure as a result of the prevailing pressure 25 in the compressed-air system 5, leading to a high power consumption of the same.

As was already illustrated, the counter-pressure directly behind the air compressor 3, i.e. on the air delivery side 3.1 of the air compressor 3, can be increased even further in such a way that a throttle 6 is switched into the air line. As a result of this throttling effect, the counter-pressure against which the air compressor 3 works is increased even further by a predetermined difference over the pressure 25 in the compressed-air system 5 as shown in FIG. 3.

According to a special embodiment of the invention, driving-specific data are evaluated for the evaluation of the route profile 12, with said driving-specific data being detected on past trips of the motor vehicle 10 on the same route or such which are similar with respect to topography and having been stored.

The invention claimed is:

1. A method for regulating a compressed-air supply system of a motor vehicle, with the vehicle comprising a drive engine for driving a motor vehicle, which drive engine drives an air compressor via a drive connection or can be switched into such a drive connection for driving the air compressor, comprising the following steps:
    the air compressor is driven by the drive engine in a supply state and is connected on an air compressor air delivery side with the compressed-air system of the motor vehicle in such a way that the air compressor supplies compressed air to the compressed-air system;
    the air compressor is selectively not driven in the air supply state and/or is not connected with the compressed-air system;
    a setting of the air compressor in the supply state or a non-supply state being made depending on the comparison of at least one switch pressure value with a pressure in the compressed-air system;
    a topography of a route on which the motor vehicle moves is detected, with said topography containing a route profile which the motor vehicle needs to cover within a predetermined, directly impending time span and/or distance along a predetermined path of the travel;
    the at least one switch pressure value is determined depending on the topography that was detected;
    a first minimum pressure range is determined for a minimum pressure in the compressed-air system, with the first pressure range having a first minimum pressure bottom limit value and a first minimum pressure upper limit value; and
    the at least one switch pressure value is set to the first minimum pressure bottom limit value when the motor vehicle moves up an ascent and a performed automatic evaluation of the route profile excludes a permanently expected braking; and
    when the motor vehicle does not move up an ascent and/or the performed automatic evaluation of the route profile does not exclude any permanently expected braking, the at least one switch pressure value is set to a value between the first minimum pressure bottom limit value and the first minimum pressure upper limit value;
    then switching to the supply state when the pressure in the compressed-air system falls below the at least one switch pressure value.

2. The method according to claim 1, wherein:
    a second switch pressure value is determined which is compared with pressure in the compressed-air system, and switching to the non-supply state when the pressure in the compressed-air system rises to the second switch pressure value;
    when the vehicle moves up an incline and a performed automatic evaluation of the route profile excludes any permanently expected braking, the second switch pressure value is set to the first minimum pressure upper limit value; and
    when the motor vehicle does not move up any incline and/or the performed automatic evaluation of the route profile does not exclude any permanently expected braking, the second switch pressure value is set to a predetermined maximum pressure value or the second switch pressure is set in a first maximum pressure range with a first maximum pressure bottom limit value and an upper limit value for a maximum pressure in the compressed-air system a first pressure upper limit value for a maximum pressure.

3. The method according to claim 2, wherein:
    a second minimum pressure range for the minimum pressure in the compressed-air system is predetermined with a second minimum pressure bottom limit value and a second minimum pressure upper limit value, with the second minimum pressure upper limit value corresponding to a predetermined maximum permissible pressure corresponding to a predetermined, maximum in the compressed-air system and the second minimum pressure bottom limit value lying above the first minimum pressure upper limit value; and
    when the vehicle moves down an incline the at least one switch pressure value is set to the second minimum pressure bottom limit; and
    when the pressure in the compressed-air system drops to the at least one switch pressure value, switching to the supply state;
    a second switch pressure value is set to the second minimum pressure upper limit value; and
    when the pressure in the compressed-air system rises to the second switch pressure value, switching to the non-supply state.

4. The method according to claim 2, wherein when the motor vehicle moves down an incline the supply state is always set and compressed air is discharged from the compressed-air system when the pressure in the compressed-air system exceeds a predetermined maximum permissible pressure.

5. The method according to claim 2, wherein when the motor vehicle moves down an incline a throttle is interposed in an air-conducting line on the air delivery side in such a way that compressed air conveyed by the air compressor is throttled and a counter-pressure against which the air compressor conveys will be increased.

6. The method according to claim 2, wherein when the motor vehicle moves down an incline the air delivery side of the air compressor is blocked by means of a shut-off valve.

7. The method of claim 2, wherein the at least one switch pressure value is set to the arithmetic mean value between the first minimum pressure bottom limit value and the first minimum pressure upper limit value of the first minimum pressure range.

8. The method according to claim 1, wherein:
    a second minimum pressure range for the minimum pressure in the compressed air system is predetermined with a second minimum pressure bottom limit value and a second minimum pressure upper limit value, with the second minimum pressure upper limit value corresponding to a predetermined, maximum permissible pressure in the compressed-air system and the second minimum pressure bottom limit value lying above first minimum pressure upper limit value;

and when the vehicle moves down an incline the at least one switch pressure value is set to the second minimum pressure bottom limit value; and when the pressure in the compressed-air system drops to the at least one switch pressure value, switching to the supply state;

a second switch pressure value is set to the second minimum pressure upper limit value; and when the pressure in the compressed-air system rises to the second switch pressure value, switching to the non-supply state.

9. The method according to claim 8, wherein when the motor vehicle moves down an incline a throttle is interposed in an air-conducting line on the air delivery side in such a way that compressed air conveyed by the air compressor is throttled and a counter-pressure against which the air compressor conveys will be increased.

10. The method of claim 8, wherein the at least one switch pressure value is set to the arithmetic mean value between the first minimum pressure bottom limit value and the first minimum pressure upper limit value of the first minimum pressure range.

11. The method according to claim 1, wherein travel-specific data are evaluated for the performed automatic evaluation of the route profile, which travel-specific data have been detected and stored during an earlier trip of the motor vehicle on the same route or a similar route with respect to the topography.

12. The method of claim 11, wherein the at least one switch pressure value is set to the arithmetic mean value between the first minimum pressure bottom limit value and the first minimum pressure upper limit value of the first minimum pressure range.

13. The method according to claim 1, wherein when the motor vehicle moves down an incline the supply state is always set and compressed air is discharged from the compressed-air system when the pressure in the compressed-air system exceeds a predetermined maximum permissible pressure.

14. The method according to claim 1, wherein when the motor vehicle moves down an incline a throttle is interposed in an air-conducting line on the air delivery side in such a way that compressed air conveyed by the air compressor is throttled and a counter-pressure against which the air compressor conveys will be increased.

15. The method according to claim 1, wherein when the motor vehicle moves down an incline the air delivery side of the air compressor is blocked by means of a shut-off valve.

16. The method according to claim 1, wherein a hydrodynamic coupling is arranged in the drive connection between the drive engine and the air compressor and a working chamber of the hydrodynamic coupling is filled with a working medium in order to switch to the supply state, and the working chamber of the hydrodynamic coupling is discharged completely or up to a predetermined residual quantity of working medium in order to switch to the non-supply state.

17. The method of claim 1, wherein the at least one switch pressure value is set to the arithmetic mean value between the first minimum pressure bottom limit value and the first minimum pressure upper limit value of the first minimum pressure range.

18. A method for regulating a compressed-air supply system of a motor vehicle, with the vehicle comprising a drive engine for driving a motor vehicle, which drive engine drives an air compressor via a drive connection or can be switched into such a drive connection for driving the air compressor, comprising the following steps:

the air compressor is driven by the drive engine in an air supply state and is connected on an air compressor air delivery side with the compressed-air system of the motor vehicle in such a way that the air compressor supplies compressed air to the compressed-air system;

the air compressor is selectively not driven in the air supply state and/or is not connected with the compressed-air system;

a setting of the air compressor in the air supply state or a non-supply state being made depending on the comparison of at least one switch pressure value with a pressure in the compressed-air system;

a topography of a route on which the motor vehicle moves is detected, with said topography containing a route profile which the motor vehicle needs to cover within a predetermined, directly impending time span and/or distance along a predetermined path of the travel;

the at least one switch pressure value is determined depending on the topography that was detected; and when the motor vehicle moves down an incline the supply state is always set and compressed air is discharged from the compressed-air system when the pressure in the compressed-air system exceeds a predetermined maximum permissible pressure.

19. The method according to claim 18, wherein when the motor vehicle moves down an incline a throttle is interposed in an air-conducting line on the air delivery side in such a way that compressed air conveyed by the air compressor is throttled and a counter-pressure against which the air compressor conveys will be increased.

20. A method for regulating a compressed-air supply system of a motor vehicle, with the vehicle comprising a drive engine for driving a motor vehicle, which drive engine drives an air compressor via a drive connection or can be switched into such a drive connection for driving the air compressor, comprising the following steps:

the air compressor is driven by the drive engine in a supply state and is connected on an air compressor air delivery side with the compressed-air system of the motor vehicle in such a way that the air compressor supplies compressed air to the compressed-air system;

the air compressor is selectively not driven in an air supply state and/or is not connected with the compressed-air system;

a setting of the air compressor in the air supply state or a non-supply state being made depending on the comparison of at least one switch pressure value with a pressure in the compressed-air system;

a topography of a route on which the motor vehicle moves is detected, with said topography containing a route profile which the motor vehicle needs to cover within a predetermined, directly impending time span and/or distance along a predetermined path of the travel; and the at least one switch pressure value is determined depending on the topography that was detected;

when the motor vehicle moves down an incline a throttle is interposed in an air-conducting line on the air delivery side in such a way that compressed air conveyed by the air compressor is throttled and a counter-pressure against which the air compressor conveys will be increased.

21. A method for regulating a compressed-air supply system of a motor vehicle, with the vehicle comprising a drive engine for driving a motor vehicle, which drive engine drives an air compressor via a drive connection or can be switched into such a drive connection for driving the air compressor, comprising the following steps:

the air compressor is driven by the drive engine in an air supply state and is connected on an air compressor air delivery side with the compressed-air system of the motor vehicle in such a way that the air compressor supplies compressed air to the compressed-air system;

the air compressor is selectively not driven in the air supply state and/or is not connected with the compressed-air system;

a setting of the air compressor in the air supply state or a non-supply state being made depending on the comparison of at least one switch pressure value with a pressure in the compressed-air system;

a topography of a route on which the motor vehicle moves is detected, with said topography containing a route profile which the motor vehicle needs to cover within a predetermined, directly impending time span and/or distance along a predetermined path of the travel; and the at least one switch pressure value is determined depending on the topography that was detected;

wherein when the motor vehicle moves down an incline the air delivery side of the air compressor is blocked by means of a shut-off valve.

22. A method for regulating a compressed-air supply system of a motor vehicle, with the vehicle comprising a drive engine for driving a motor vehicle, which drive engine drives an air compressor via a drive connection or can be switched into such a drive connection for driving the air compressor, comprising the following steps:

the air compressor is driven by the drive engine in a supply state and is connected on an air compressor air delivery side with the compressed-air system of the motor vehicle in such a way that the air compressor supplies compressed air to the compressed-air system;

the air compressor is selectively not driven in an air supply state and/or is not connected with the compressed-air system;

a setting of the air compressor in the supply state or a non-supply state being made depending on the comparison of at least one switch pressure value with a pressure in the compressed-air system;

a topography of a route on which the motor vehicle moves is detected, with said topography containing a route profile which the motor vehicle needs to cover within a predetermined, directly impending time span and/or distance along a predetermined path of the travel; and the at least one switch pressure value is determined depending on the topography that was detected;

a hydrodynamic coupling is arranged in the drive connection between the drive engine and the air compressor and a working chamber of the hydrodynamic coupling is filled with a working medium in order to switch to the supply state, and the working chamber of the hydrodynamic coupling is discharged completely or up to a predetermined residual quantity of working medium in order to switch to the non-supply state.

* * * * *

UNITED STATES PATENT AND TRADEMARK OFFICE
CERTIFICATE OF CORRECTION

| | | |
|---|---|---|
| PATENT NO. | : 8,162,620 B2 | Page 1 of 1 |
| APPLICATION NO. | : 11/721288 | |
| DATED | : April 24, 2012 | |
| INVENTOR(S) | : Markus Kley et al. | |

It is certified that error appears in the above-identified patent and that said Letters Patent is hereby corrected as shown below:

Claim 2, Column 8, Line 12, after system delete "a first pressure upper limit value for a maximum pressure"

Claim 3, Column 8, Line 22, delete "corresponding to a predetermined, maximum"

Signed and Sealed this
Twenty-eighth Day of August, 2012

David J. Kappos
*Director of the United States Patent and Trademark Office*